(12) United States Patent
Yoshida et al.

(10) Patent No.: US 7,536,776 B2
(45) Date of Patent: May 26, 2009

(54) FABRICATION METHOD FOR THIN FILM MAGNETIC HEADS

(75) Inventors: Nobuo Yoshida, Kanagawa (JP); Taku Shintani, Kanagawa (JP); Hisako Takei, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 401 days.

(21) Appl. No.: 11/454,310

(22) Filed: Jun. 13, 2006

(65) Prior Publication Data

US 2006/0278604 A1 Dec. 14, 2006

(30) Foreign Application Priority Data

Jun. 14, 2005 (JP) ............................. 2005-174117

(51) Int. Cl.
G11B 5/127 (2006.01)
H04R 31/00 (2006.01)

(52) U.S. Cl. .............. 29/603.16; 29/603.13; 29/603.14; 29/603.15; 29/603.18; 216/62; 216/65; 216/66; 360/121; 360/122; 360/317; 360/324; 360/325; 427/127; 427/128; 451/5; 451/41

(58) Field of Classification Search . 29/603.13–603.16, 29/603.18; 360/122, 126, 317, 324–327; 427/127, 128; 451/5, 41; 216/62, 65, 66
See application file for complete search history.

(56) References Cited

U.S. PATENT DOCUMENTS

| 6,669,983 | B2 | 12/2003 | Kagami et al. | |
|---|---|---|---|---|
| 6,947,264 | B2* | 9/2005 | Gill | 360/324.2 |
| 6,980,403 | B2 | 12/2005 | Hasegawa | |
| 2002/0089794 | A1* | 7/2002 | Chang et al. | 360/317 |
| 2004/0036994 | A1 | 2/2004 | Kainuma et al. | |
| 2004/0168302 | A1* | 9/2004 | Mino | 29/603.15 |
| 2006/0234483 | A1* | 10/2006 | Araki et al. | 438/551 |

FOREIGN PATENT DOCUMENTS

JP 2003-298144 10/2003

* cited by examiner

*Primary Examiner*—Paul D Kim
(74) *Attorney, Agent, or Firm*—Townsend and Townsend and Crew LLP; Rambod Nader

(57) ABSTRACT

A fabrication method for thin film magnetic heads, comprises, forming a Current Perpendicular to a Plane (CPP) sensor film over a lower shield and a first chemical mechanical polishing (CMP) stop film over the CPP sensor film, etching the CPP sensor film and forming a track width on the CPP sensor film, and covering at least the etching section of the CPP sensor film with an insulating film. The method further comprises forming a CMP dummy film over the insulating film and a second CMP stop film over the CMP dummy film, exposing the first CMP stop film, and removing the first CMP stop film and the second CMP stop film by oxygen reactive ion etching (RIE) and the CMP dummy film by fluorine RIE, and forming an upper shield film over the insulating film and over the CPP sensor film.

24 Claims, 15 Drawing Sheets

(Prior Art)

(Prior Art)

( Prior Art )

FABRICATION METHOD FOR THIN FILM MAGNETIC HEADS

CROSS-REFERENCES TO RELATED APPLICATIONS

This application claims priority from Japanese Patent Application No. JP 2005-174117, filed Jun. 14, 2005, the entire disclosure of which is incorporated herein by reference.

BACKGROUND OF THE INVENTION

The present invention relates to a manufacturing method for thin film magnetic heads utilized in magnetic disk devices, and relates in particular to a manufacturing method for thin film magnetic heads utilized for reading.

The thin film magnetic heads mounted in HDD require a narrow track width and narrow gap length and high sensitivity in order to keep pace with the ever higher recording density of HDD. The thin film magnetic head currently utilizes a combination of a write (recording) head and a read head. The read heads are mainly GMR heads that utilize the GMR effect. These GMR heads are CIP (Current In Plane) type heads that allow electrical signals to flow in the film parallel to the sensor film surface. There has been intensive work into developing CPP-GMR (Current Perpendicular to a Plane Giant Magneto-Resistive Effect) and TMR (Tunneling Magneto-Resistive effect) heads that possess an excellent high output even with narrow track width and narrow gap length, in order to keep pace with still further future advances towards higher recording density. Unlike the conventional GMR head, that uses a CIP type head where electrical signals flow parallel within the film surface, the significant difference in the TMR head and CPP-GMR head is that a CPP head is used where electrical signals flow in a direction perpendicular to the film surface.

Prior technology relating to the CPP head that serves as the CPP-GMR head is disclosed in JP-A No. 198000/2003. The bottom electrode (lower pole) includes a protrusion that contacts the sensor film, and by making the width contacting the sensor film of the upper lead (top pole) smaller than the lower lead (bottom pole), the alignment margin can be improved and a tiny contact section formed. The technology in JP-A No. 298144/2003 contains a lower pole with a protruding shape resembling that of JP-A No. 198000/2003. In this laid-open technology, the protruding section is planarized, and a more uniform sensor film can be formed, so that characteristics are improved.

A lift-off process is normally used as shown in FIG. 1 for forming the track widths. As shown in FIG. 1(a), a lift-off pattern 3 is formed on the sensor film 2 over the bottom shield 1. This cross sectional shape of this lift-off pattern 3 possesses an undercut. Etching of the sensor film 2 is performed as shown in FIG. 1(b) by utilizing this lift-off pattern 3 as a mask. Next, after forming the insulating film 4 (and others) as shown in FIG. 1(c), unnecessary sections on the insulating film are removed by lift-off using a solvent process such as with a remover as shown in FIG. 1(d). This undercut makes the etching and lift-off easy to perform after forming the film.

Other processes for forming the track width have been proposed. A method disclosed in JP-A No. 123916/2002 proposes a thin-film magnetic head embedded in the surrounding sensor film by planarizing film and planarizing technology. A method disclosed in JP-A No. 132509/2003 proposes a thin-film magnetic head where the track width is formed by CMP (chemical mechanical polishing) and milling. A structure in which a shield film is installed on the side of the sensor film to prevent side-reading has also been proposed. One example is disclosed in JP-A No. 264324/2003.

BRIEF SUMMARY OF THE INVENTION

Forming a narrow track width is impossible when utilizing the lift-off process to form track widths on thin film magnetic heads used for read (playback). In the conventional lift-off process, a lift-off pattern 3 containing an undercut in the lower section of the pattern is utilized as shown in FIG. 1. The pattern width must be reduced in order to obtain a smaller track width, and the undercut width therefore must also be shortened according to that pattern width. When the pattern width is reduced but the undercut is kept at the same width, then the lift-off pattern might itself collapse. However, if the undercut width is reduced then lift-off becomes impossible.

This problem is described using the process drawing in FIG. 2. As shown in FIG. 2(a), the pattern width of the lift-off pattern 3 is made smaller than that in FIG. 1 when the pattern width is made smaller. The undercut width must be reduced in order to prevent the pattern from collapsing. As shown in FIG. 2(b), the sensor film 2 is etched by using the lift-off pattern as a mask in the same way as in FIG. 1(b). The insulating film 4 (and others) are next formed as shown in FIG. 2(c). Unlike FIG. 1(c), the undercut section is small so that this undercut section is blocked by items adhering during etching and the insulating film 4 (and others) formed after this etching as shown in FIG. 2(c). Therefore as shown in FIG. 2(d), unnecessary sections of the insulating film 4 (and others) are supposedly removed by lift-off using a solvent process. However the remover in the lift-off processing cannot penetrate inwards so that lift-off becomes impossible, and therefore a fence shape remains on the wall surface of the lift-off resist pattern as shown in FIG. 2(d). In even worse cases, lift-off cannot be performed and the state in FIG. 2(c) still remains.

In the methods in JP-A No. 123916/2002 and JP-A No. 132509/2003 on the other hand, the sensor film and surrounding film are approximately the same height, and this structure makes adjusting the height of the surrounding film difficult. Therefore achieving a structure where the positions of the domain control film and the upper shield film can be adjusted as needed, or a structure (side shield structure) where the shield film is installed to the side of the sensor film is shown in JP-A No. 123916/2002, is impossible.

After etching the sensor film, a magnetic film serving as the side shield film is formed and planarized. FIG. 3 is a drawing showing the manufacturing process in that case. As shown in FIG. 3(a), the etching mask 5 and the CMP stop film 6 such as resist are formed over the sensor film 2. Next, as shown in FIG. 3(b), the sensor film 2 is etched. After then forming the insulating film 7 and the side shield film 8 as shown in FIG. 3(c), a CMP stop film 9 such as of DLC (diamond-like carbon) is formed. Lift-off by CMP is then performed as shown in FIG. 3(d). Next, the remaining CMP stop films 6, 9 are removed as shown in FIG. 3(e). The side shield film 8 can in this way be formed and lift-off performed using a mask pattern not possessing an undercut. In this case, the magnetic film serving as the side shield film 8 is usually a soft magnetic film such as NiFe.

Lift-off can in this way be performed without utilizing a lift-off pattern, however the CMP polishing rate on NiFe is rapid compared with utilizing DLC as the CMP stop film so that dishing tends to easily occur. One example is shown in the process chart in FIG. 4.

As shown in FIG. 4(a), the insulating film (alumina, etc.) 7, side shield film (NiFe, etc.) 8, CMP stop film (DLC etc.) 9, are formed after etching the sensor film 2. Then, as shown in FIG.

4(b), lift-off is performed by utilizing CMP. However, the CMP polishing rate on NiFe is rapid when compared with utilizing DLC as the CMP stop film so that dishing tends to easily occur in the edge area of the track 77 as described above. As this dishing progresses, a cavity or recess is prone to occur in the NiFe serving as the side shield film 8 as shown in FIG. 4(b). As this phenomenon progresses further, a cavity or recess from dishing might even occur up to the insulating film 7 contacting the side of the sensor film 2. The upper shield film 10 is next formed as shown in FIG. 4(c). A consequence of forming the upper shield 10 in a state where dishing has occurred, causes the shape of the shield on the edge of the sensor to deteriorate as shown in the figure, and might cause defects in the characteristics. Further, when the dishing is large on the insulating film 7 in contact with the side of the sensor film 2, the sensor wall surface can no longer be insulated, so that electrical shorts might possibly occur on the sensor film wall surface due to an electrically conductive film such as the upper shield film 10 formed afterwards. When these type of problems occur, there might be a large drop in yield (productivity).

In FIG. 3(e), the sensor film and its surrounding film thickness are approximately the same height but the height around the sensor film 2 varies greatly due to (differences in) the process and head structure. As sizes continue to shrink, this variation in height is likely to exert adverse effects on subsequent processes. Those adverse effects are especially likely to occur in the photolithography process and etching process. Typical problems that occur when there are level (height) variations are described utilizing FIG. 5.

FIG. 5(a) is a drawing showing a cross section. FIG. 5(b) is a drawing showing a view from above. FIG. 5(a) is the cross section of A-A' shown in FIG. 5(b). FIG. 5 shows the stripe height forming mask 11 for forming in the direction of the stripe height, after forming in the track width direction. As shown in FIG. 5(a), unlike FIG. 3 and FIG. 4, there is no side shield film 8 formed on the side of this sensor 2, so that the height around the sensor film is a lower structure than the sensor film 2. Due to this difference (in height), a non-uniform (unequal) film thickness in the resist film and halation (diffused reflections) in the exposure light occur, that might cause poor dimensional precision and shape defects. Those adverse effects are particularly obvious at the edge area of the stripe height 78 as shown in FIG. 5(b).

The description up until now has covered the track width direction, however similar problems also occur in the stripe height direction. A typical problem is described using the process drawings in FIG. 6. After etching the sensor film 2 using the stripe height forming mask 11 and the CMP stop film 12 as the etching mask as shown in FIG. 6(a), the insulating film 13, the magnetic film 14 such as NiFe film, and the CMP stop film 15 such as DLC are formed. Next, as shown in FIG. 6(b), unnecessary sections are removed by CMP and planarizing performed. Then, the upper shield film 10 is formed as shown in FIG. 6(c). In this case, the CMP polishing rate on NiFe is rapid compared to when using DLC as the CMP stop film so that dishing tends to easily occur as shown in FIG. 6(b), the same as previously described. Consequently, defects in the characteristics might occur due to deterioration of the shield shape at the edge area of the stripe height 79, and electrical shorts might occur on the sensor film wall.

This invention is contrived to eliminate the problems of the related art. In other words, this invention has the feature of providing a manufacturing method for thin magnetic heads capable of achieving narrow tracks, eliminating shape defects and electrical short defects, and improving the production yield.

In accordance with an aspect of the present invention, the fabrication method for film magnetic heads includes: a process for forming a CPP sensor film over a lower shield, a process for forming a first CMP stop film over the CPP sensor film, a process for etching the CPP sensor film and forming a track width (or width in stripe height direction) over the CPP sensor film, a process for covering at least the etched portion of the CPP sensor film with an insulating film, a process for forming a CMP dummy film on the insulating film, a process for forming a second CMP stop film over the CMP dummy film, a process for exposing the first CMP stop film, a process for removing the first CMP stop film and the second CMP stop film by oxygen-based RIE (reactive ion etching), a process for removing the CMP dummy film by fluorine-based RIE, and a process for forming an upper shield film over the remaining insulating film and CPP sensor film.

This invention is capable of fabricating a desired sensor wall and a fine pattern shape without shape defects, by planarizing with a CMP stopper and a CMP dummy film, and removing the CMP stopper and CMP dummy film.

The CPP sensor film is made from multilayer film containing magnetic layers. This multilayer film contains at least a free layer serving as a magnetic field signal sensor film. An instack bias structure comprised of a CPP sensor film integrated with a domain control bias film may be employed to magnetically stabilize the free layer. The CPP sensor film often contains a pinned layer affixed in the direction of magnetism and that is also antiferromagnetic. The CPP sensor may even contain an underlayer film and a capping film. In the case of TMR film, an oxide film may be formed between the free film and the pinned film. In the case of CPP-GMR film, a current confined (conducting) film may be formed.

A soft magnetic film may be formed via an insulating film on the track width direction region of the CPP sensor film in the head air bearing surface. The lower limit film thickness position of that soft magnetic film is preferably formed at a position lower than the upper limit film thickness position of the CPP sensor film. Moreover, the lower limit film thickness position of that soft magnetic film formed on the track width direction region of the CPP sensor film on the head air bearing surface is preferably formed at a position lower than the magnetic field signal sensor film of the CPP sensor film serving as the free layer. In the case of the track height direction, a soft magnetic film may be formed via the insulating film, and the lower limit film thickness position of that soft magnetic film is preferably formed at a position lower than upper limit film thickness position of the CPP sensor film. Even more preferable is forming the lower limit film thickness position of that soft magnetic film at a position lower than the magnetic field signal sensor film serving as the free layer in the CPP sensor film.

The CMP etching speed relation between the CMP stop film and the CMP dummy film is described next. When the CMP etching rate of the first CMP stop film and the second CMP stop film is set as $\alpha$, and the CMP etching rate of the CMP dummy layer is set as $\beta$ the etching rate relation is preferably $\alpha<\beta$. Moreover, when the CMP rate for magnetic (domain) film formed between the process for covering the etched section of the CPP sensor film with insulating film and the process for forming the CMP dummy film is set as $\gamma$, then the etching rate relation is preferably $\alpha<\beta<\gamma$.

This invention is capable of forming track widths even in narrow track widths, and eliminates electrical short defects and shape defects by utilizing a planarizing process. This invention may also be applied to side shield structures and hard bias structures. This invention is particularly effective in forming side shield structures, and capable of fabricating magnetic heads for handling high recording densities.

No shape defects occur on the shield film on the side towards the stripe height, even when utilized in planarizing processes in the stripe height direction, and a magnetic head can be fabricated that possesses improved heat dissipation and improved magnetic signal field conversion efficiency. Further, the dimensional precision is improved and pattern shape defects prevented when forming patterns on a planarized surface.

DETAILED DESCRIPTION OF THE INVENTION

The modes for implementing this invention are described next. The thin film head of this invention is normally utilized as the read head, and is used in combination with the write head. Unless specially required, the write head sections are omitted, and only the read head is described.

Figure 7:
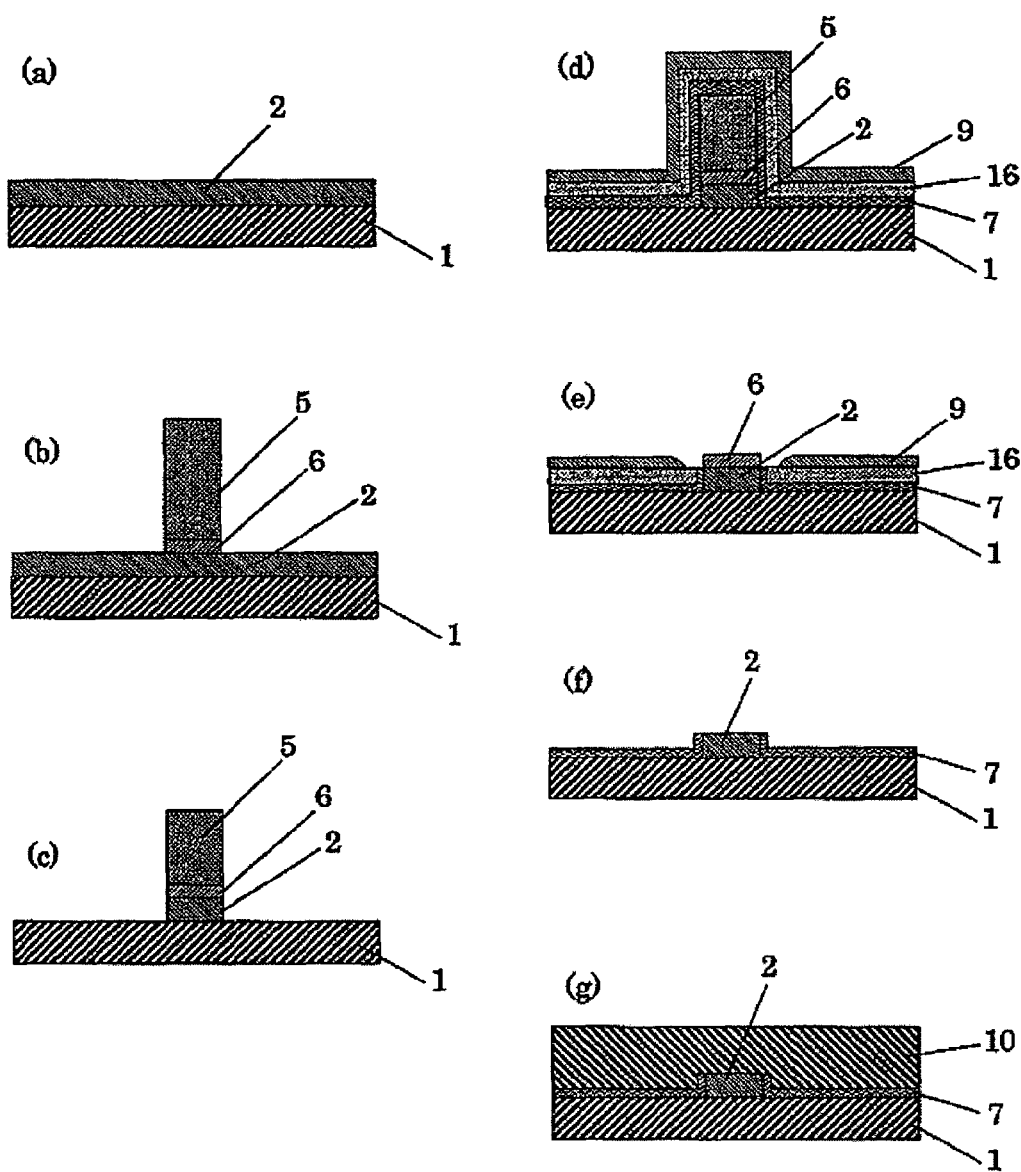
FIG. 7 is a cross sectional process view showing an embodiment of the magnetic head fabrication method of this invention.

FIG. 7 is process cross sectional views showing an embodiment of the fabrication method for the magnetic head of this invention. As shown in FIG. 7(a), a CPP sensor film 2 serving as the sensor film is formed over the lower shield 1 that may also be the pole (electrode). Next, as shown in FIG. 7(b), a first CMP stop film 6 is formed over the CPP film using DLC, and a track forming mask 5 is formed using resist, etc. Next, as shown in FIG. 7(c), the CPP sensor film 2 is etched using the first CMP stop film 6 and the track forming film 5 as the etching mask.

Figure 4:
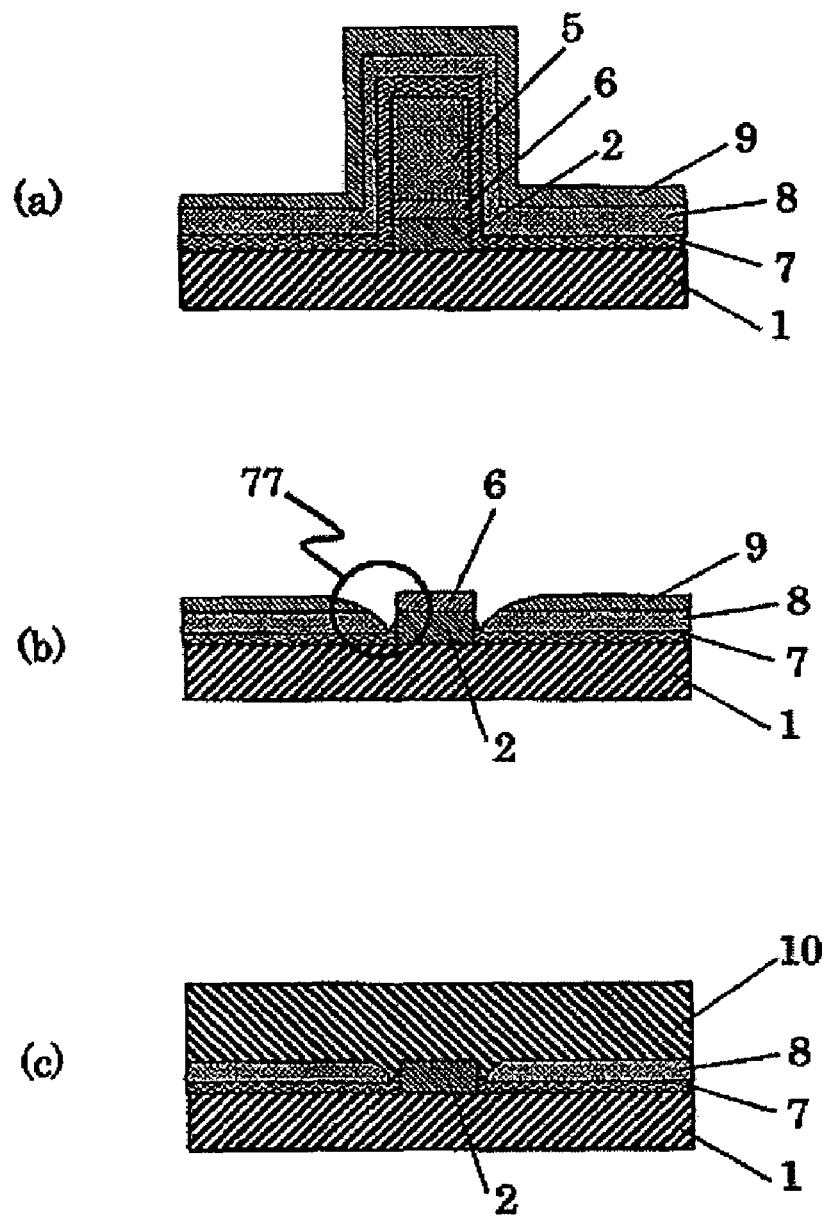
FIG. 4 shows drawings for describing problems when using CMP.

As next shown in FIG. 7(d), an insulating film 7 such as made from alumina is formed for maintaining the insulation of the CPP film etching wall surface. A CMP dummy film 16 made for example from $SiO_2$ is formed, and a second CMP stop film 9 utilizing for example DLC is formed over it (CMP dummy film 16). Here, the first CMP stop film 6 possesses the task of protecting the CPP sensor film 2 during CMP, and the second CMP stop film 9 is formed to the same height as the first CMP stop film 6, or formed at a position slightly higher than the first CMP stop film 6. Lift-off is next performed utilizing for example CMP as shown in FIG. 7(e). In this case, the solvent process of the conventional art using a remover may also be utilized. Lift-off by CMP for example can easily be achieved by performing the CMP processing after using the remover solvent. Here, a side shield film 8 and an insulating film 7 were formed to the side of the CPP sensor film 2 as shown in FIG. 4. However in FIG. 7, an insulating film 7 and a CMP dummy film 16 are formed. The CMP dummy film 16 is an insulating film made from $SiO_2$ rather than a magnetic film such as NiFe.

The first CMP stop film 6 and the second CMP stop film 9 are removed as next shown in FIG. 7(f) by oxygenic ashing or oxygen RIE (Reactive Ion Etching). The DLC serving as the CMP stop film easily reacts with the oxygen plasma to allow removal (stripping). Here, only the DLC is removed since removing any thing other than the DLC with oxygen plasma is difficult. Afterwards, the $SiO_2$ is removed by RIE utilizing fluorine gas. The $SiO_2$ serving as the CMP dummy film 16 is a material capable of being etched by fluorine gas. The alumina serving as the insulating film 7 is a material extremely difficult to etch with fluorine gas, and therefore only the CMP dummy film 16 is removed. Afterwards, as shown in FIG. 7(g), the upper shield film 10 serving as the pole (electrode) is formed using a soft magnetic material such as NiFe, etc. The upper shield film 10 which is also soft magnetic material may also be formed to cover the side of the CPP sensor film 2 and therefore may possess the function of a side shield as well as the function of an upper shield.

In FIG. 7(d), $SiO_2$ is utilized as the CMP dummy film 16 as described above. The $SiO_2$ is an oxide film and therefore capable of resisting etching by CMP better than NiFe which is a metallic film. Consequently, the dishing such as shown in FIG. 4 can be reduced. Also, even if dishing occurs on the $SiO_2$ utilized as the CMP dummy film 16 due to fluctuations during the process, that CMP dummy film 16 is removed so there are no effects on the forming of the shield film. Defects in the shape of the shield and shorts on the wall surface of the CPP sensor film 2 can therefore be prevented, the process margin can also be expanded, and productivity (yield) improved. The resistance of the CMP dummy film 16 to CMP is preferably smaller than that of the CMP stop film. The reason this is preferable is that if the dummy film resistance to CMP is the same as the CMP stop film, then it might resist peeling and remain as a fence (shape).

As shown in FIG. 7, by removing the CMP dummy film 16, and forming an upper shield film 10, this upper shield film 10 can also be formed to the side of the CPP sensor film 2. In other words, a narrow track width can be formed simultaneously with a structure for covering the CPP sensor film 2. In the positional relationship in the direction of film thickness between the CPP sensor film 2 and the upper shield film 10, the lower limit film thickness position of that upper shield film 10 is positioned lower than the upper limit film thickness position of the CPP sensor film 2. This positional relationship allows a structure that reduces magnetic field signals from unnecessary medium by means of a shield or in other words, a side shield structure can easily be achieved. The CPP sensor film 2 is comprised of a multi-layer film such as magnetic film or non-magnetic film, however if the film thickness lower limit position of the upper shield film 10 is positioned lower than the position of the magnetic film for detecting the magnetic signal field, then a stronger side shield effect can be obtained. This is described while referring to FIG. 17.

Figure 17:
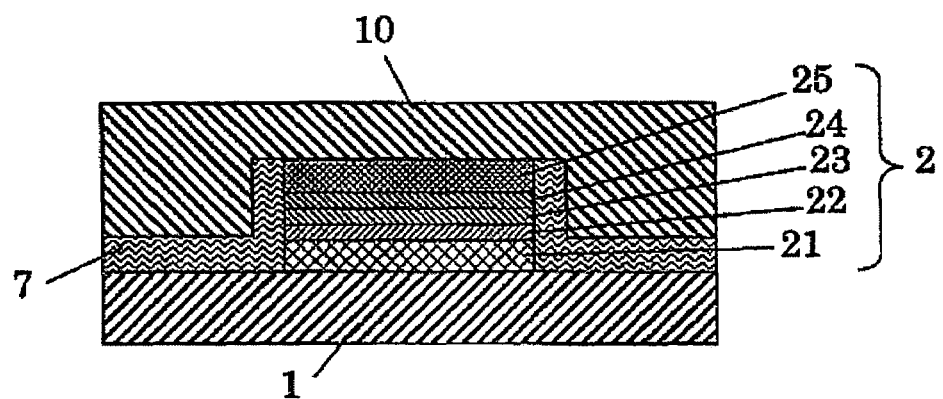
FIG. 17 is an enlarged concept view of the vicinity of the CPP sensor film.

FIG. 17 is an expanded concept diagram of the vicinity of the CPP sensor film 2 in FIG. 7(g). As shown in FIG. 17, there is a CPP sensor film 2 over the lower shield 1, that is enclosed by the insulating film 7, and an upper shield film 10 is formed over these (films). An upper shield film 10 serving as the soft magnetic film is formed via the insulating film 7 along the track width direction of the CPP sensor film 2, and the upper shield film 10 of the track width direction (area), functions as the side shield. The CPP sensor film 2 includes an antiferromagnetic film 21, a pinned layer 22, a free layer 23, a domain control bias film 24, and a domain control anti-ferromagnetic film 25. The CPP sensor film shown in FIG. 7 and FIG. 17 does not contain domain control film such as possessing a hard bias structure. A domain control bias film 24 functions to provide domain control of the free layer 23 serving as the magnetic field signal sensor film. In other words, the structure shown in FIG. 7 and FIG. 17 is an instack bias structure in which the domain control film is integrated with the CPP sensor film. Utilizing an instack bias structure for the CPP sensor film allows eliminating the domain control film formed along the track width direction that was required in the conventional hard bias structure. The upper shield film 10 can in this way cover the CPP sensor film 2 up to the track width direction. In other words, in the positional relationship between the CPP sensor film 2 and the upper shield film 10 serving as the soft magnetic film as shown in FIG. 17, in the track width direction of the CPP sensor film, the upper shield film 10 is formed at a position lower than the upper limit film thickness position of the CPP sensor film 2 (film 10 is lower than the top of film 2). Moreover, positioning the upper shield film 10 film thickness lower limit position lower than the free layer 23 position serves to further increase this side shield effect.

There is another effect of the upward/downward relation described above. Cleaning of the upper surface of the CPP sensor film 2 is performed by milling or sputter-etching during the forming of the upper shield film 10. However, if the CPP sensor film 2 is in a state protruding upwards then the cleaning can be easily performed. Conversely, if the CPP sensor film 2 upward/downward relation is reversed, or in other words if in a recessed (concave) state, then the cleaning effect is weakened.

In FIG. 7, $SiO_2$ was utilized as the CMP dummy film 16, however the CMP dummy film 16 may be a material that can be removed by RIE utilizing fluorine gas. For example, tantalum oxide or tungsten oxide may be used. These materials may be utilized separately or in combination. The fluorine RIE device need not be only the conventional parallel-plate-type RIE but may be an etching device including a high density plasma source. In either case, the etching selectivity rate versus the alumina utilized in the insulating film 7 is large so that alumina can still remain after etching of the CMP dummy film 16. Also in this invention, adhesion layers or capping film may be formed up to several nanometers on the upper section or lower section of films such as the first CMP stop film 6 and the second CMP stop film 9, and CMP dummy film 16, etc.

Figure 8:
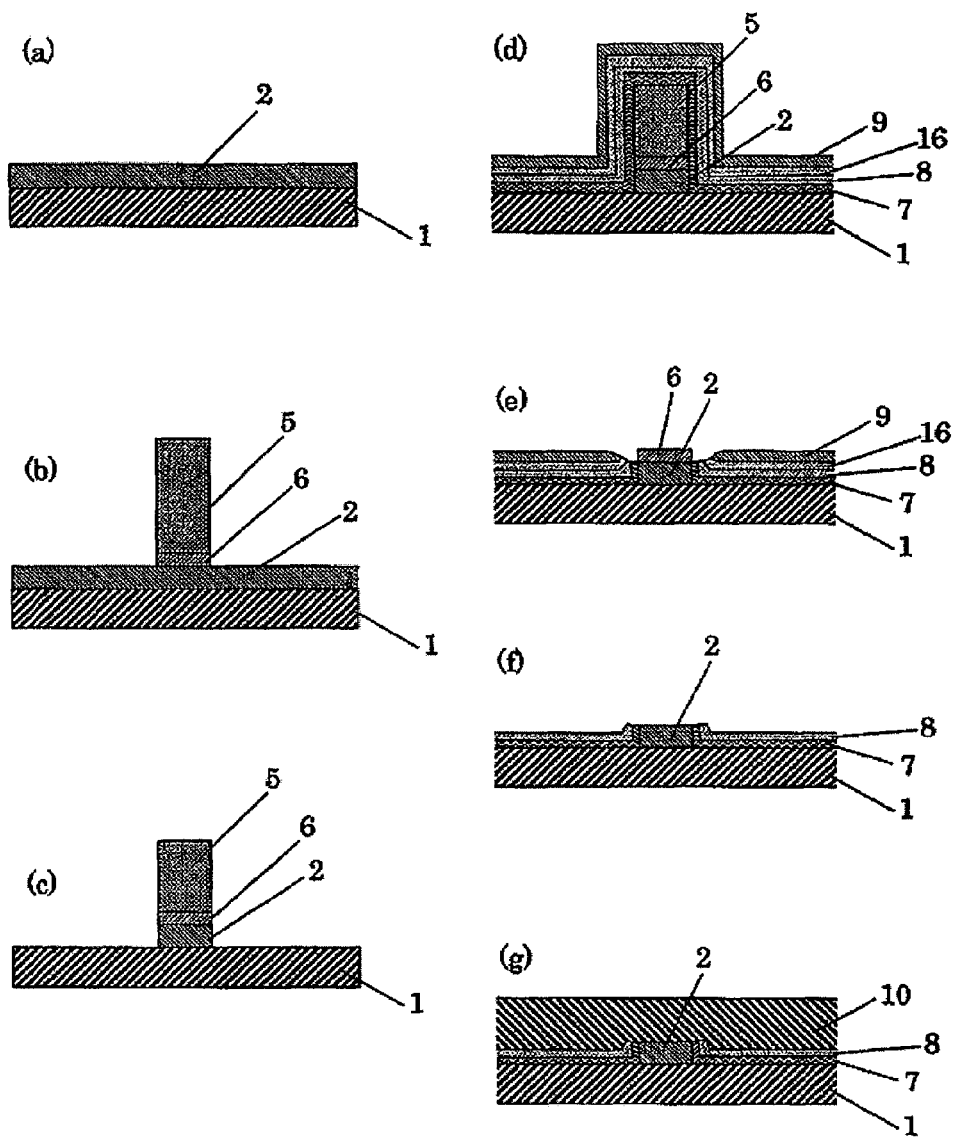
FIG. 8 is a cross sectional process view showing another embodiment of the magnetic head fabrication method of this invention.

FIG. 8 is process cross sectional views showing another embodiment of the magnetic head fabrication method of this invention. As shown in FIG. 8(a), the CPP sensor film 2 serving as the sensor film is formed over the lower shield 1 that also functions as the pole (electrode). Next, as shown in FIG. 8(b), a first CMP stop film 6 is formed utilizing DLC over the CPP film, and a track forming mask 5 is formed from resist, etc. Next, as shown in FIG. 8(c), the CPP sensor film 2 is etched using the first CMP stop film 6 and the track forming film 5 as the etching mask. Next, as shown in FIG. 8(d), an insulating film 7 is formed such as from alumina in order to obtain insulation of the CPP film etching wall surface. Further, after forming the side shield film 8 utilizing NiFe, a CMP dummy film 16 is formed from $SiO_2$, etc. A second CMP stop film 9 utilizing DLC is formed over this (film 16). Next, as shown in FIG. 8(e), lift-off is performed by CMP, etc. Next, as shown in FIG. 8(f), the first CMP stop film 6 and second CMP stop film 9 are removed by oxygen ashing or oxygen RIE. Afterwards, the $SiO_2$ serving as the CMP dummy film 16 is removed by fluorine RIE, etc. Then, as shown in FIG. 8(g), the upper shield film 10 serving even as the pole (electrode) is formed.

FIG. 8 contains an insulating film 7, a side shield film 8, and a second CMP stop film 9 the same as in FIG. 4 yet is different from FIG. 4 in one point. The differing point is that the side shield film 8 is thinner than the film of FIG. 4. The dishing depth during CMP lift-off processing is greatly dependent on the width of the exposed side shield film 8. In other words, the exposed width is dependent on the film thickness so that by making the film thinner, the amount of dishing can be reduced. However that (thinner film) alone is not enough to deal with CMP lift-off. The reason for this is that since CMP is a leveling or planarizing process, performing uniform planarizing is impossible unless the height approximately matches that of the surroundings. In this invention, the CMP dummy film 16 is formed with the side shield film 8 made thinner so that a height equivalent to the surroundings (periphery) can be obtained.

This embodiment differs from the embodiment shown in FIG. 7, in that the side shield film 8 can be formed separately to allow widening the selection of materials formed to the side of the CPP sensor film 2. The side shield film 8 may utilize laminations of magnetic film or may be used in combination with an underlayer film or a protective film to improve the characteristics.

Eliminating the CMP dummy film 16 and thickening the second CMP stop film 9 was also considered. However the DLC film utilized as the CMP stop film possesses an extremely high degree of hardness as well as high stress. Therefore lift-off still remains even if CMP is utilized and a fence is made so that the DLC film itself might possibly peel (separate) due to film stress. Therefore making the DLC film serving as the CMP stop film thicker is not preferable, and in this point the present embodiment is the same as the embodiment of FIG. 7.

Figure 18:
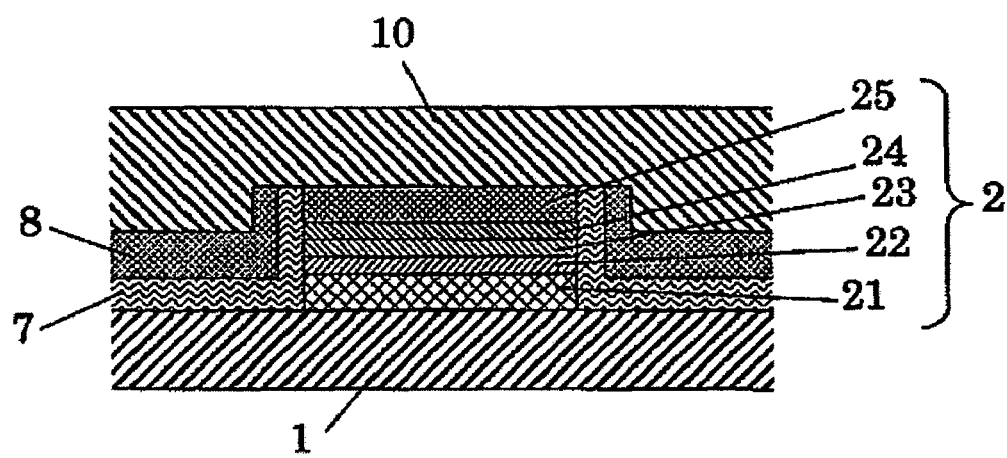
FIG. 18 is an enlarged concept view of the vicinity of the CPP sensor film.

FIG. 18 is an enlarged view of the vicinity of the CPP sensor film 2 of FIG. 8(g). The CPP sensor film 2 is an instack bias structure the same as shown in FIG. 17, and the hard bias film can be omitted. The side shield film 8 serving as the soft magnetic film is formed via the insulating film 7 in the direction of the CPP sensor film 2 track width. Their positional relation is the same as described in FIG. 17, in which side shield effect is achieved by positioning the side shield film 8 at a position lower than the CPP sensor film 2. In other words, as shown in FIG. 18, the CPP sensor film 2 and the side shield film 8 serving as the soft magnetic film are positioned relative to each other such that the side shield film 8 is formed lower than the upper limit film thickness of the CPP sensor film 2 in the direction of track width. The side shield effect can be still further increased by forming the free layer 23 at a position below the film thickness lower limit position of the side shield film 8.

In the embodiments for FIG. 8 and FIG. 18 described up until now, the side shield film 8 was formed to the side of the CPP sensor film 2. Also in this invention, instead of the side shield film 8, a domain control film can be formed to the side of the CPP sensor film 2. An example is shown in the enlarged view of the vicinity of the CPP sensor film 2 shown in FIG. 19.

Figure 19:
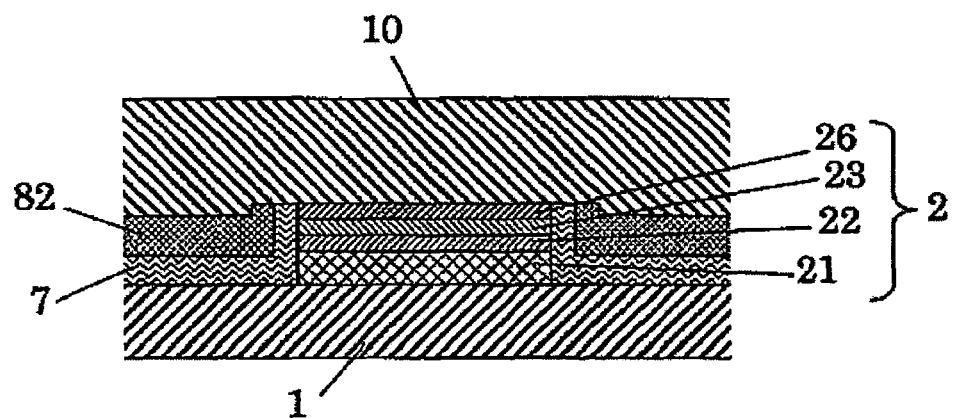
FIG. 19 is an enlarged concept view of the vicinity of the CPP sensor film.

More specifically, in FIG. 8, a soft magnetic film was formed as the side shield film 8. However this embodiment differs in that a hard magnetic film is formed as the domain control film 82 at the side shield film 8 position in FIG. 19. However these are magnetic films in either case so the resistance to CMP is not very large. The film characteristics of the domain control film 82 can also be adjusted by means of the film thickness, etc. The difference in film thickness between the CPP sensor film and the periphery becomes larger according to the film thickness of the domain control film 82, and might make uniform planarizing by CMP impossible. Forming a CMP dummy layer therefore proves effective for uniform CMP planarizing (or leveling) and for preventing dishing of the domain control film 82. Hard magnetic film such as CoPt or CoCrPt is often utilized as the domain control film 82. Also, an underlayer film may be formed or a protective film may be formed to improve the characteristics of these hard films. Even in the case of this embodiment, the film thickness lower limit position of the upper shield film 10 may be formed at a position lower than the film thickness upper limit position of the CPP sensor film 2, the same as described for FIG. 7. The structure of the CPP sensor film 2 here includes an anti-ferromagnetic film 21, a pinned layer 22, a free layer 23, and a capping film 26, the same as shown in FIG. 19. In-stacked structures such as the domain control bias film 24, and the domain control anti-ferromagnetic film 25 can be omitted by forming the domain control film 82.

Utilizing this invention allows obtaining a narrow track width simultaneously with high pattern dimensional accuracy. Also, forming patterns on a planarized surface in this invention allows obtaining the desired pattern without shape defects. This is described utilizing the planarizing drawing of FIG. 15 and the cross sectional process views of the magnetic head shown in FIG. 9.

Figure 15:
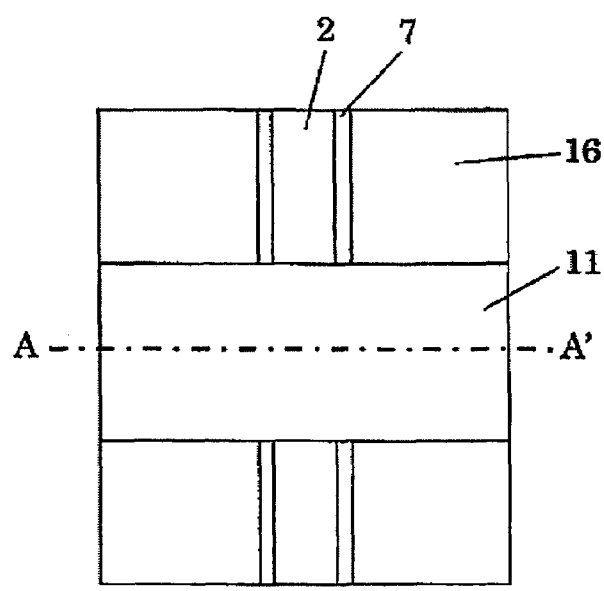
FIG. 15 is a flat (plan) view corresponding to FIG. 9(d)

In FIG. 9(a), after forming the mask 5 such as from the first CMP stop film 6 and resist by utilizing DLC (or others) on the CPP film, the CPP sensor film 2 is etched using the first CMP stop film 6 and the track forming mask 5 as the etching mask. Next, the insulating film 7, the side shield film 8, the CMP dummy film 16, and the second CMP stop film 9 are formed. In other words, the state in FIG. 9(a) is the same as in FIG. 7(d), Next as shown in FIG. 9(b), lift-off is performed utilizing CMP, etc. Next as shown in FIG. 9(c), the first CMP stop film 6 and the second stop film 9 are removed utilizing oxygenic ashing or oxygen RIE. In FIG. 7, the CMP dummy film 16 is later removed, but in this embodiment is left remaining. Next, as shown in FIG. 9(d), a stripe-height forming mask 11 is formed to define the stripe height direction. The cross sectional shape A-A' on the flat view shown in FIG. 15, is FIG. 9(d).

Figure 5:
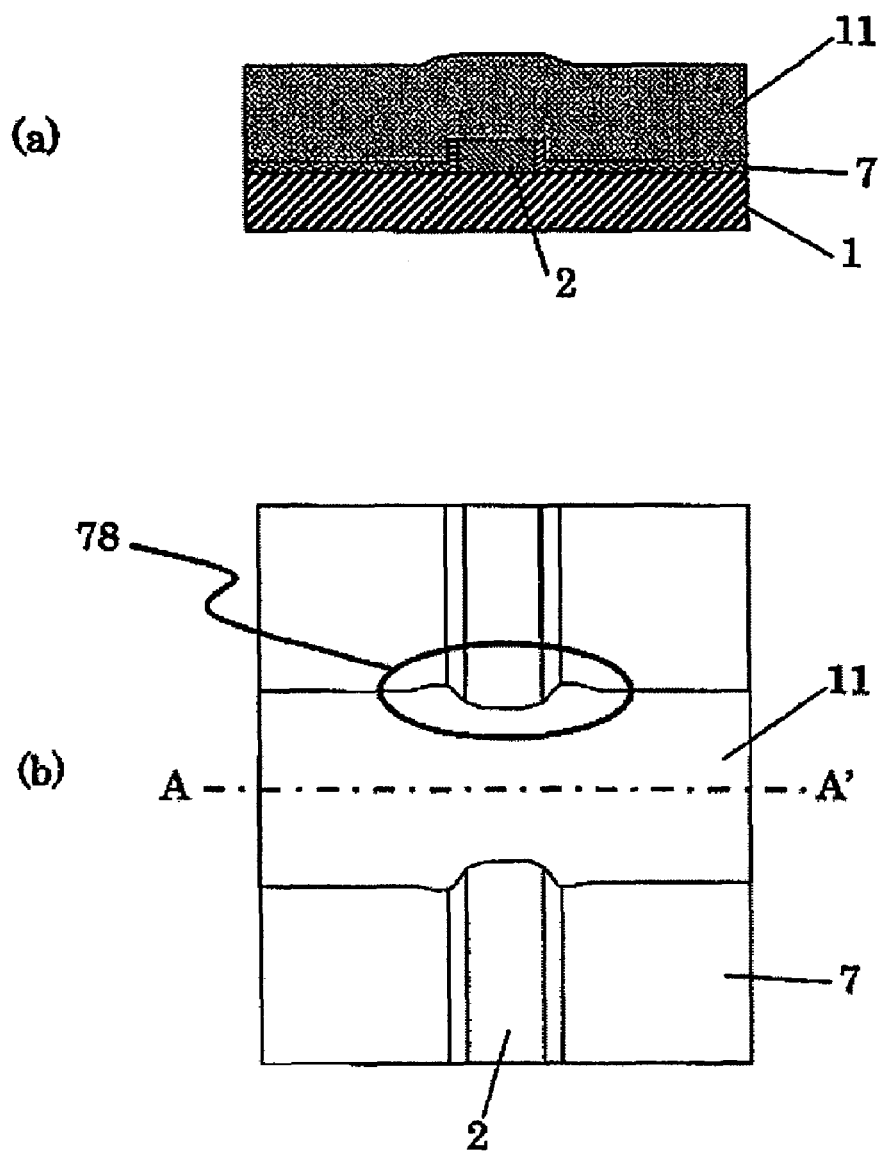
FIG. 5 shows drawings for describing problems when there shows a step difference.

In other words, FIG. 9(d) is a figure showing the state where the first CMP stop film 6 and the second CMP stop film 9 are removed after forming the CPP sensor film 2 width in the track direction, and where the stripe-height forming mask 11 defining the stripe height direction was formed in a state where at least the CMP dummy layer film 16 is remaining. Comparing with FIG. 5 clearly shows that a stripe-height forming mask 11 can be formed on a largely level surface in order to leave the CMP dummy film 16 remaining. Therefore shape forming defects such as occurring in FIG. 5, will not occur on the stripe-height forming mask 11.

Figure 9:
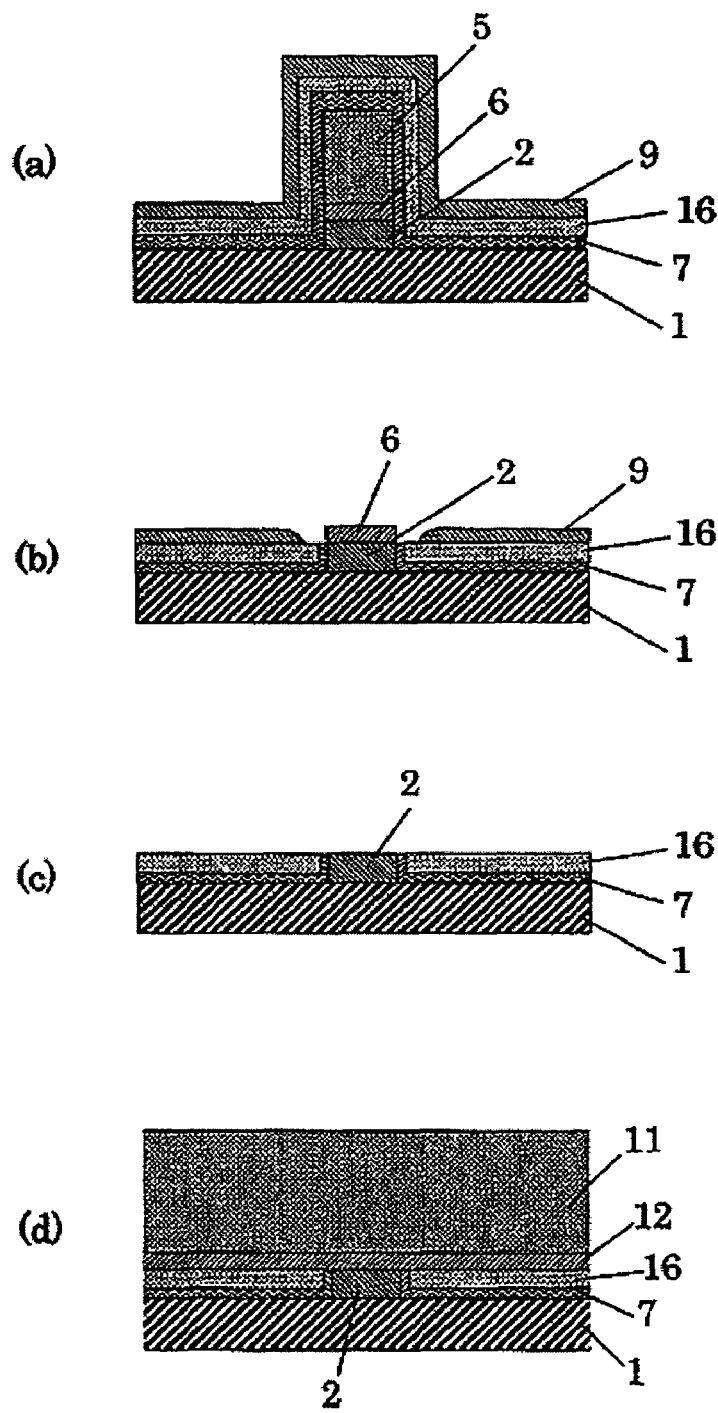
FIG. 9 is a cross sectional process view showing another embodiment of the magnetic head fabrication method of this invention.

In FIG. 9(d), a CMP stop film 12 is formed on the section below the stripe-height forming mask 11 assuming the case of this invention as related later on. Also, other than the method in FIG. 9 and methods related later on for this invention, a lift-off method utilizing the remover solvent process of the conventional art may be utilized. In this case also, the step difference in the track width edge section is reduced so that deterioration in dimensional accuracy in the stripe height direction is reduced. Also in this embodiment, the embodiments such as for the previous embodiments for FIG. 7 and FIG. 8 can be combined, to simultaneously obtain the effects of the combined embodiments. More specifically, a forming process to form the stripe height as in this embodiment may be performed in which just the first CMP stop film 6 and the second stop film 9 may be removed utilizing oxygenic ashing or oxygen RIE and, and the CMP dummy film 16 left remaining as in FIG. 7 and FIG. 8.

The lift-off described in this invention up until now was mainly for forming the track width. However this invention is also effective for lift-off used for forming the stripe height. This is described utilizing the process cross sectional view of the magnetic head shown in FIG. 10.

The CPP sensor film 2 serving as the sensor film may be formed over the lower shield 1 serving as the pole (electrode) as shown in FIG. 10(a). After then forming the first CMP stop film 12 utilizing DLC over the CPP film, the stripe-height forming mask 11 is formed using resist, etc., as shown in FIG. 10(b). The CPP sensor film 2 is then etched using the first CMP stop film 12 and the stripe height forming mask 11 as the etching mask as shown in FIG. 10(c). Next, an insulating film 13 of alumina is formed for ensuring insulation of the CPP film etching wall surface as shown in FIG. 10(d). Further, after forming $SiO_2$ as the CMP dummy film 17, the second CMP stop film 15 is formed over it utilizing DLC, etc. Next, as shown in FIG. 10(e), lift-off is performed with CMP, etc. Then, as shown in FIG. 10(f), the first CMP stop film 12 and the second CMP stop film 15 are removed utilizing oxygenic ashing or oxygen RIE, etc. Then, the $SiO_2$ serving as the CMP dummy film 17 is removed such as by fluorine RIE. Then, as shown in FIG. 10(g), the upper shield film 10 that may even serve as the pole (electrode) is formed.

Figure 6:
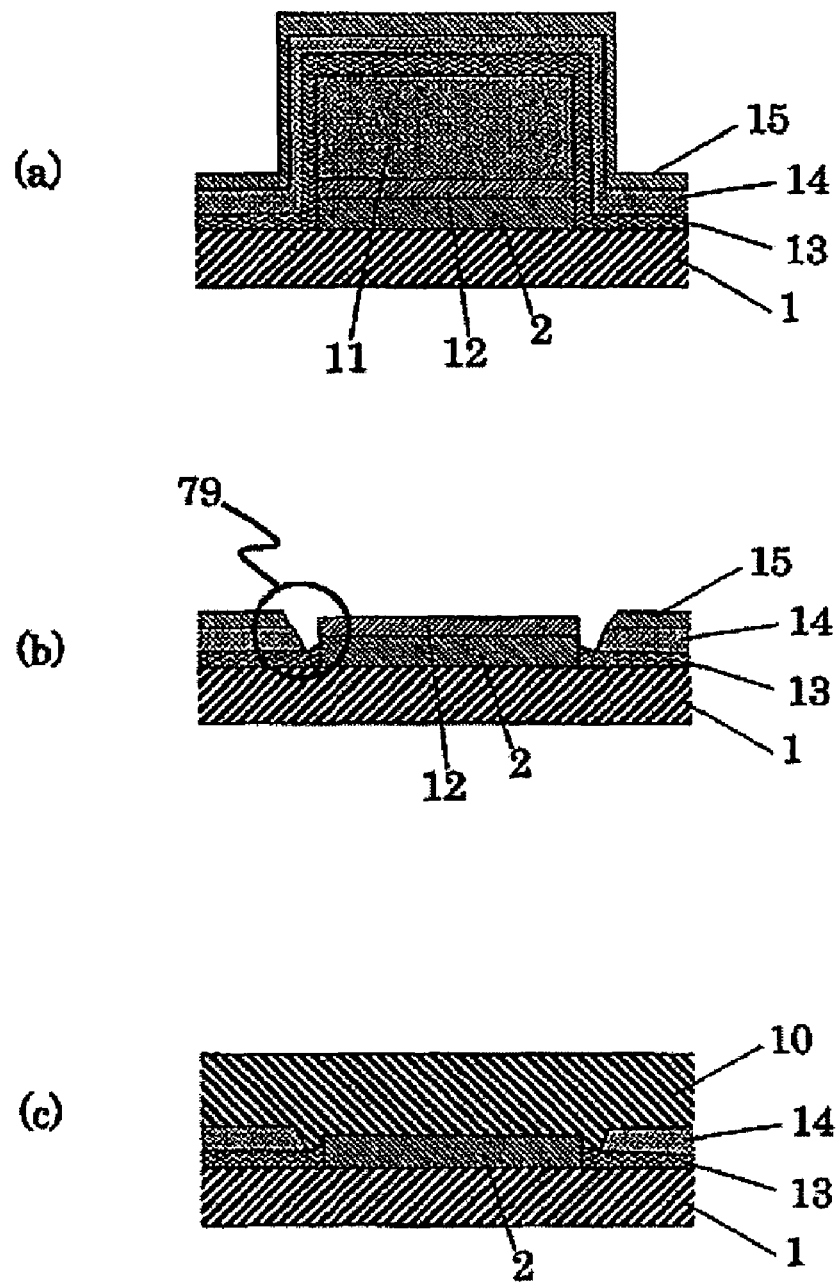
FIG. 6 shows drawings for describing problems when utilizing CMP.
Figure 10:
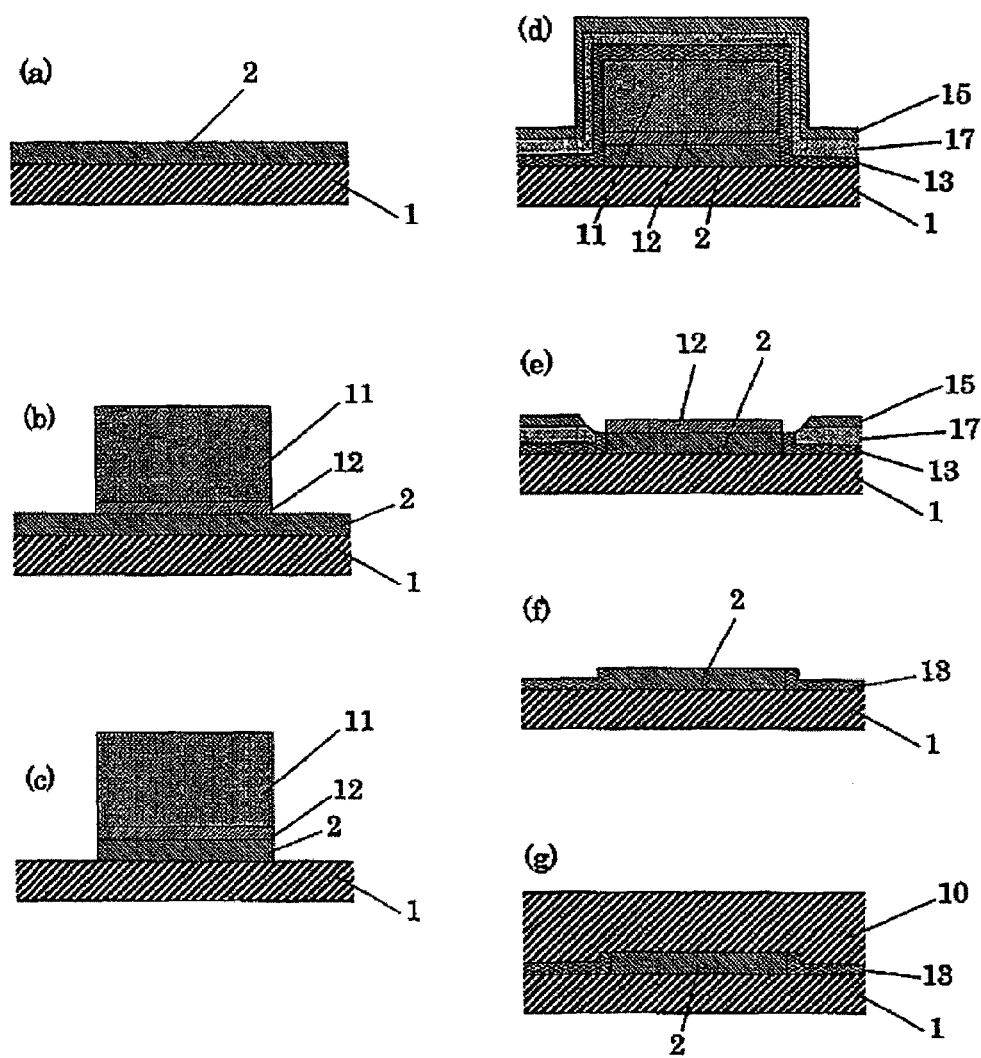
FIG. 10 is a cross sectional process view showing another embodiment of the magnetic head fabrication method of this invention.

In other words, (the embodiment of) FIG. 10 differs from the case of FIG. 6 in that a CMP dummy film 17 is formed over the insulating film 13. Lift-off is then performed utilizing CMP however no shape defects such as shown in FIG. 6(b) occur and therefore no insulation defects and no shield shape defects occur. Also, as shown in FIG. 10(g), a structure where the film thickness lower limit position of the upper shield film 10 is positioned at least at a position lower than the film thickness upper limit position of the CPP sensor film 2 can easily be obtained in the stripe-height direction. This structure permits converting electrical signals from the magnetic signal field with greater efficiency. By forming the magnetic field in the stripe height direction of the CPP sensor film 2, the magnetic signal field can be input to the CPP sensor film 2 more efficiently. Also, by forming more metal films in the vicinity of the CPP sensor film 2, the heat radiation efficiency can be improved to handle heat generated by the power being supplied.

Another embodiment of this invention is not shown in the drawings but is a fabrication method that can also be applied in the stripe height direction based on the same concept as the embodiment of FIG. 8. More specifically, in FIG. 10, a magnetic film utilizing NiFe is formed between the CMP dummy film 17 and the insulating film 13 for maintaining the insulation of the CPP film etching wall surface. A second CMP stop film 15 utilizing DLC is then formed over it (magnetic film). The magnetic film in that case can be thinner than the magnetic film 14 in FIG. 6, and the dishing such as shown in FIG. 6(b) can be reduced. Consequently, characteristics defects due to deterioration of the shield shape, and shorts in the sensor film wall surface can be prevented in the edge area of the stripe height 79. Further, in this case also, the transform efficiency of the magnetic signal field and the heat radiation efficiency effect can be improved, the same as in the embodiment shown in FIG. 10.

Figure 11:
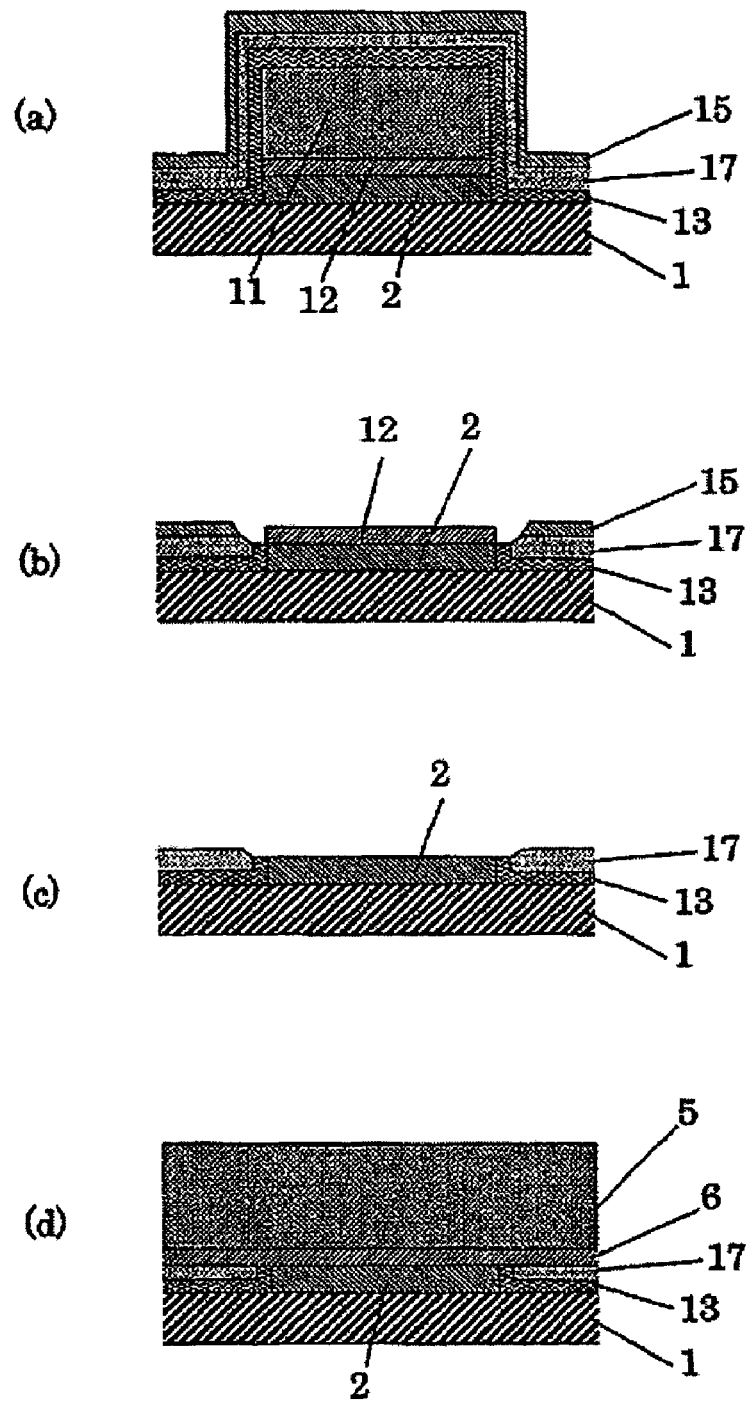
FIG. 11 is a cross sectional process view showing another embodiment of the magnetic head fabrication method of this invention.

The improvement in pattern accuracy during forming in the stripe height direction after forming in the track width direction was described in the embodiment of FIG. 9. Next, the effect of this invention on improving pattern accuracy during forming in the track width direction after forming the stripe height direction is described by utilizing the process cross sectional drawings shown in FIG. 11.

FIG. 11(a) is a drawing showing the same state as in FIG. 10(d). In other words, the strip height forming mask 11 using the first CMP stop film 12 and resist utilizing DLC is formed over the CPP film, after forming the CPP sensor film 2 serving as the sensor film, over the lower shield 1 serving even as the pole (electrode). Then, the CPP sensor film 2 is etched using the first CMP stop film 12 and the stripe height forming mask 11 as the etching mask. The insulating film 13 such as alumina for maintaining the insulation of the CPP film etching wall surface is then formed. The SiO$_2$ serving as the CMP dummy film 17 is then formed, and then the second CMP stop film 15 is formed over it utilizing DLC, etc.

Figure 16:
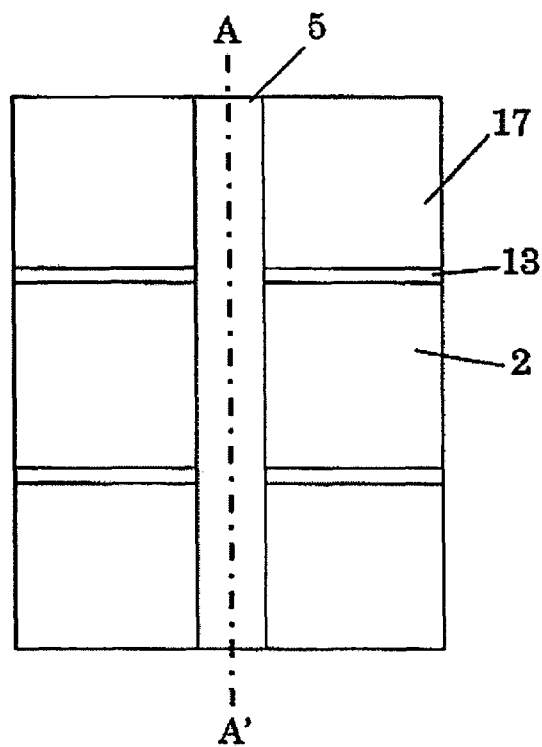
FIG. 16 is a flat (plan) view corresponding to FIG. 11(d)

Next, lift-off is performed utilizing CMP as shown in FIG. 11(b). Then, as shown in FIG. 11(c), the first CMP stop film 12 and the second CMP stop film 15 are removed utilizing oxygenic ashing or oxygen RIE, etc. In FIG. 10, the CMP dummy film 16 is later removed in FIG. 10, but in this embodiment the CMP dummy film 16 is left remaining. Next, as shown in FIG. 11(d), a track forming mask 5 is formed to define the track width. The cross sectional shape A-A' on the flat view shown in FIG. 16, is FIG. 11(d).

Figure 1:
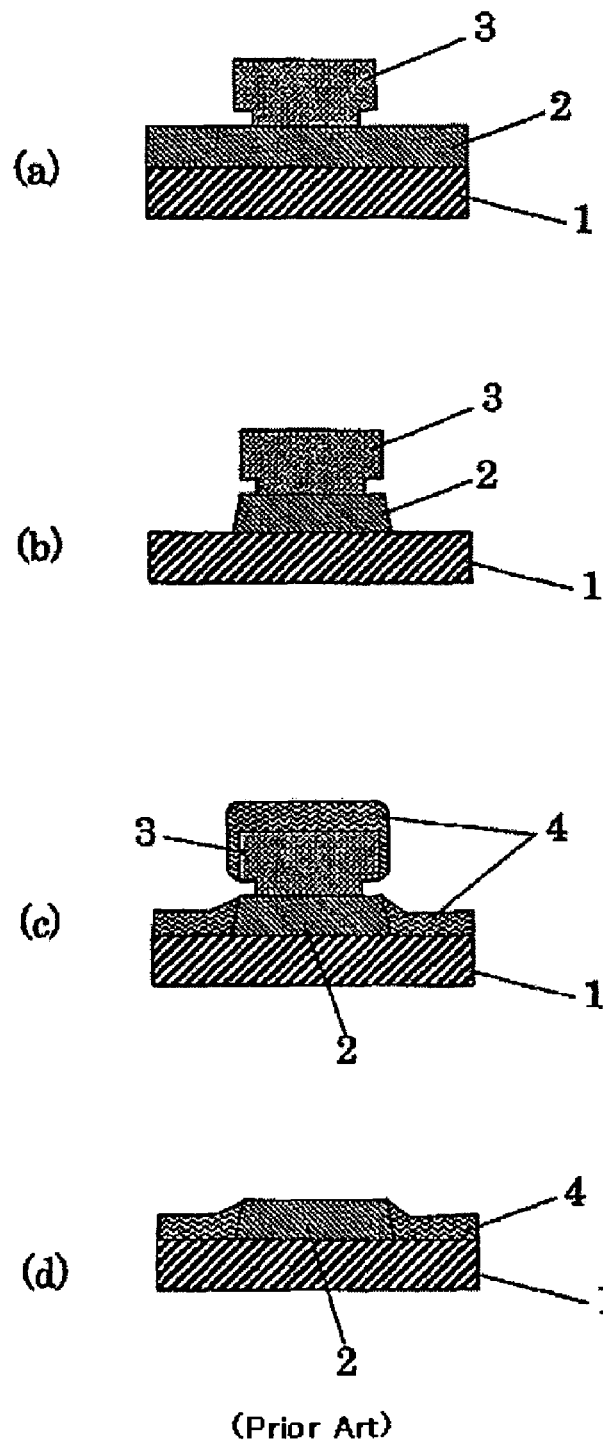
FIG. 1 shows drawings of the lift-off process.
Figure 2:
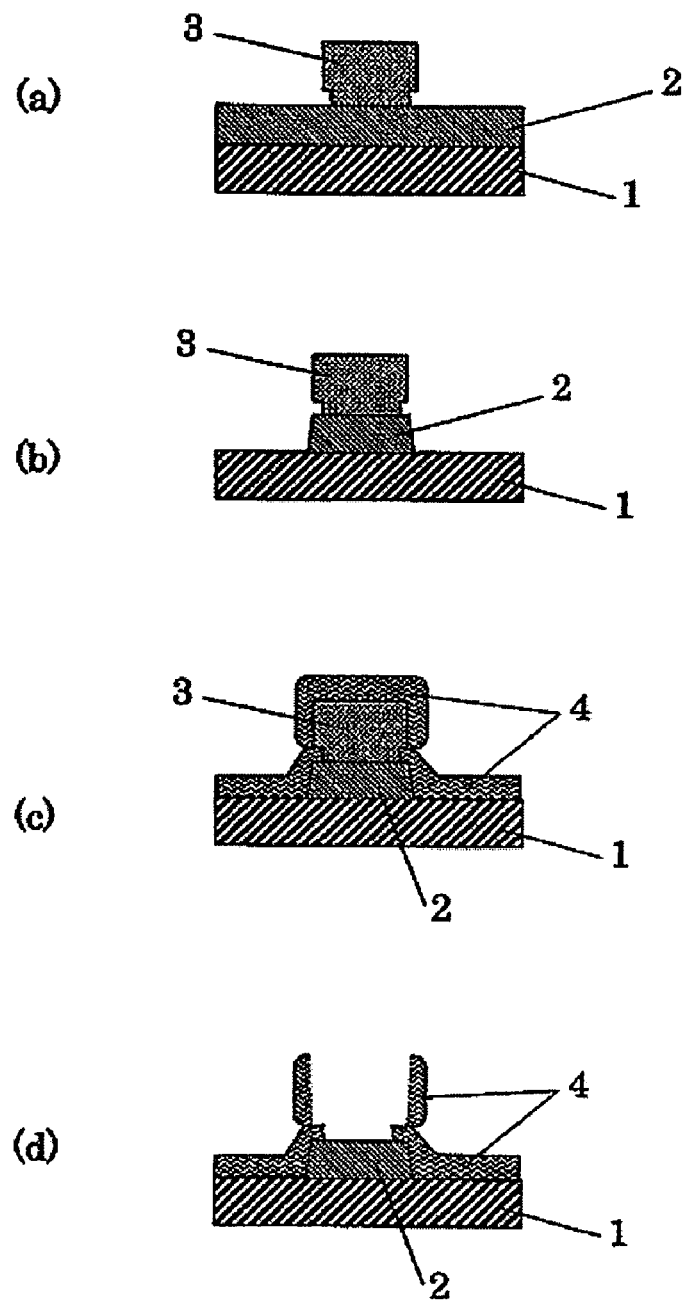
FIG. 2 shows drawings for describing the problems of the method of the conventional art.
Figure 3:
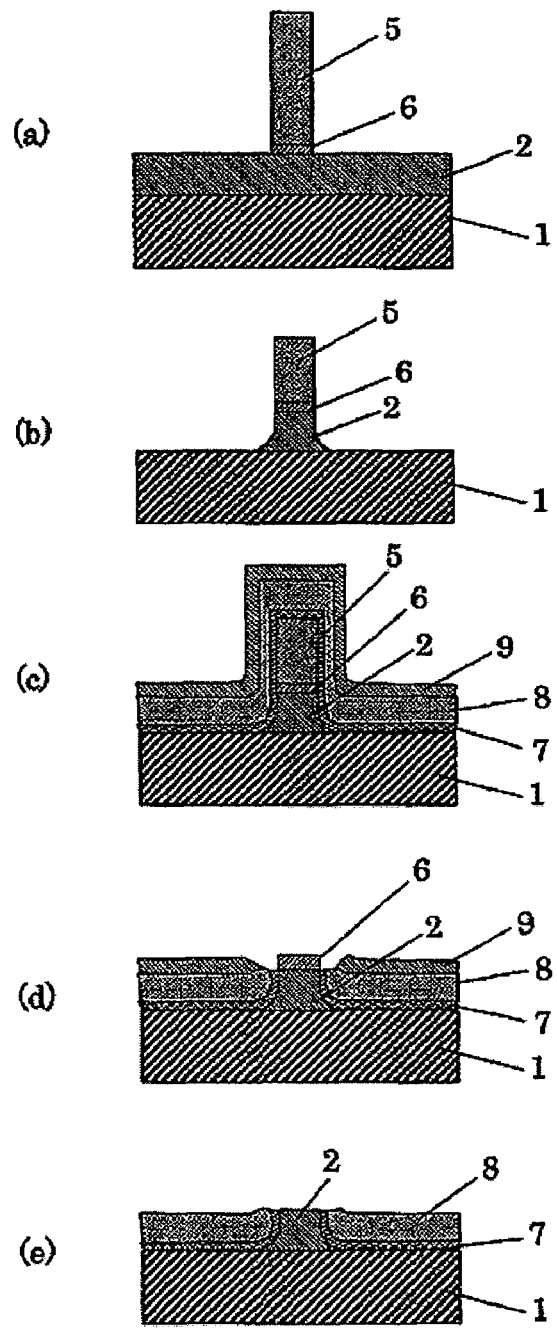
FIG. 3 shows drawings for describing the fabrication process utilizing CMP.

In other words, in the embodiment of FIG. 1, after etching the CPP sensor film 2 in the stripe height direction, the first CMP stop film 12 and the second CMP stop film 15 are removed and in state with at least the CMP dummy film 17 remaining, the track forming mask 5 for defining the track width is formed. The track forming mask 5 is in many cases fabricated by photolithography as with the stripe height forming mask 11 and therefore forming the pattern on a level surface is effective in terms of preventing shape defects and improving dimensional accuracy. This invention is capable of forming the track forming mask 5 on a level surface as shown in FIG. 11(d) and can therefore prevent shape defects and improve dimensional accuracy. A first CMP stop film 6 is formed on the section below the track forming mask 5 assuming a structure applicable to this invention as previously described in FIG. 7 and FIG. 8. When combined in this way with other embodiments of this invention, the effects obtained previously in FIG. 7 and FIG. 8 can be simultaneously obtained. The method of the conventional art may be used as the track forming method. In this case also, the difference in the stripe height direction is reduced so that a deterioration in track width accuracy can be reduced.

The examples in the embodiments up till now described removing all of the CMP dummy film 16. However a portion of this CMP dummy film 16 can be left remaining by changing the structure or the process, and the distance between the upper shield film 10 and the lower shield 1 serving as the pole (electrode) can widened. The occurrence of (electrical) short defects in the lower shield 1 and the upper shield film 10 can in this way be prevented. Also, the static capacitance can be reduced by lowering the distance between the shields, and the frequency characteristics can in this way be improved. An example is described utilizing the cross sectional view of the head shown in FIG. 12.

Figure 12:
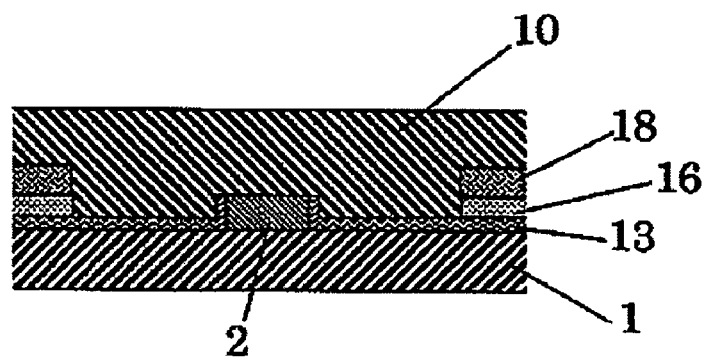
FIG. 12 is a cross sectional view showing an example of the magnetic head of this invention.

FIG. 12 is a drawing showing the forming of the track width using this invention, and forming to the upper shield film 10 while leaving the CMP dummy layer 16 still remaining. The CMP dummy film 16 in the vicinity of the CPP sensor film 2 must be removed. However before removing it, a material to function as an etching mask and not etchable in the CMP dummy film removal process such as alumina is formed as the CMP dummy etching mask 18, and leaves the CMP dummy film 16 remaining. The CMP dummy etching mask 18 and the CMP dummy film 16 are insulating films and therefore function as insulating films for the lower shield 1 and the upper shield film 10, and therefore the above described effect can be obtained. The example in FIG. 12 showed the CMP dummy film 16 remaining during the forming of the track, however the CMP dummy film 17 can also be left remaining with the same method during forming of the stripe height.

Figure 13:
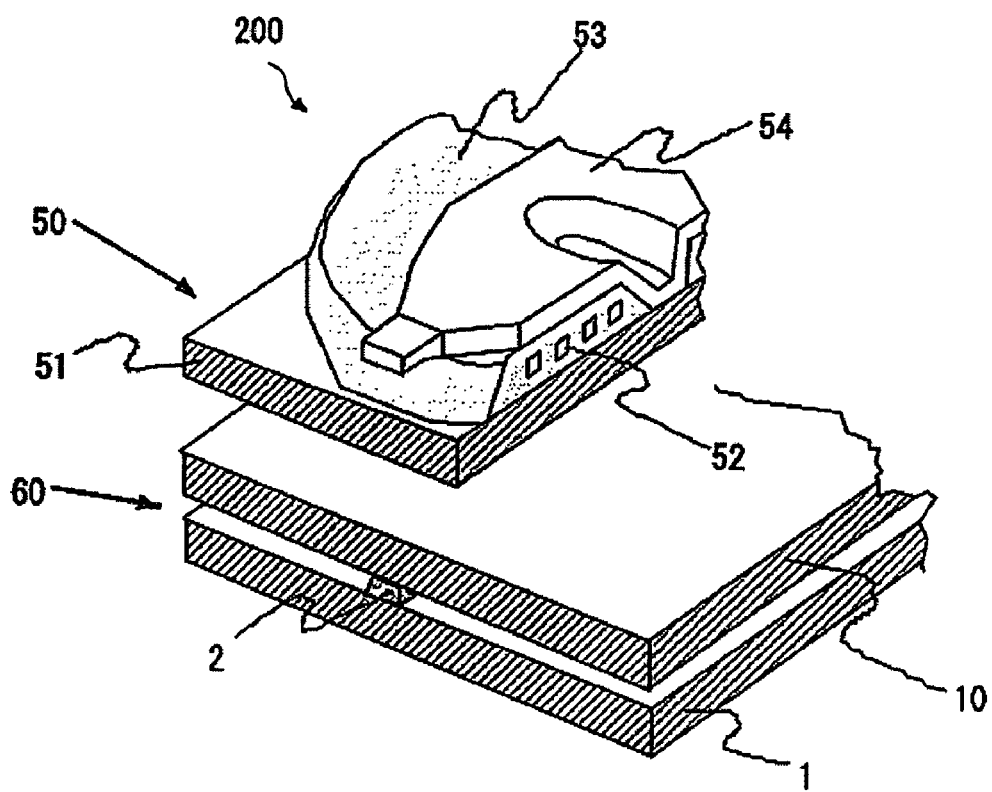
FIG. 13 shows concept views of the magnetic head incorporating the read head fabricated by the method of this invention.

FIG. 13 is concept diagram drawings of the magnetic head incorporating the read head manufactured by the method of this invention. The magnetic head 200 is made up of a read head 60 and a write head 50. The write head 50 is a head structure for perpendicular recording, and includes a sub pole 51, a coil 52, a coil insulator 53, and a main pole 54. The write head is capable of being utilized for longitudinal recording. The read head 60, is a thin film magnetic head fabricated by the manufacturing method described in the embodiment, and only the lower shield 1, the CPP sensor film 2, and the upper shield film 10 are shown and the other components are omitted from the drawing. The read head of this invention possesses the effects described up to now, can prevent short defects and shape defects even on narrow track widths, and can improve the productivity (yield). The frequency characteristics can also be improved by utilizing the read head of the embodiment shown in FIG. 12.

Figure 14:
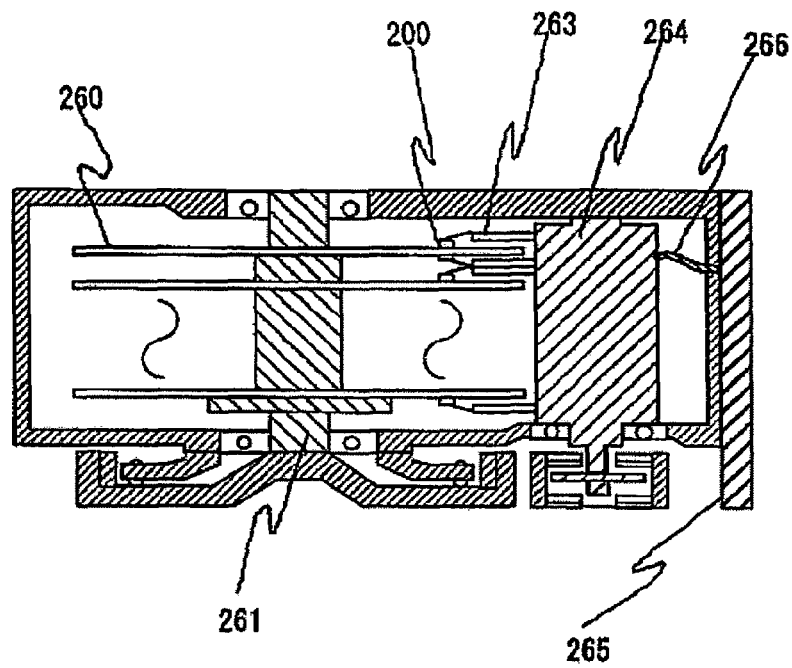
FIG. 14 is a cross sectional concept view showing an example of the magnetic disk device.

FIG. 14 is a cross sectional pictorial view showing an example of the magnetic disk device. The magnetic disk device includes a magnetic disk 260, a spindle 261, a voice coil motor 264, a gimbal 263, a magnetic head 200, wires 266, and a signal processing circuit 265. The magnetic head shown in FIG. 13 was utilized in the magnetic head 200. Installing the thin film magnetic head of this invention allows obtaining a magnetic disk device with improved recording density and frequency characteristics compared to the conventional art.

The contents of this invention were described in detail utilizing the embodiments. Numerous adaptations and variations can be obtained based on the fundamental technical concepts and the disclosure in this invention. For example the track width forming and the stripe height forming were separately described in many sections; however, a combination of the track width forming and the stripe height forming may be utilized, based on the technical concepts and the disclosure in this invention.

The film structure of the CPP sensor film 2 was not described in detail; however if a device in which a sensing current flows perpendicular to the sensor film, then the effect of the invention can be obtained.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A fabrication method for thin film magnetic heads comprising:
   forming a CPP sensor film over a lower shield;
   forming a first CMP stop film over the CPP sensor film;
   etching the CPP sensor film and forming a track width on the CPP sensor film;
   covering at least the etching section of the CPP sensor film with an insulating film;
   forming a CMP dummy film over the insulating film;
   forming a second CMP stop film over the CMP dummy film;
   exposing the first CMP stop film;
   removing the first CMP stop film and the second CMP stop film by oxygen RIE;
   removing the CMP dummy film by fluorine RIE and;
   forming an upper shield film over the insulating film and over the CPP sensor film.

2. The fabrication method for thin film magnetic heads according to claim 1, further including forming a magnetic film over the insulating film, between covering at lest the etching section on the CPP sensor film with insulating film and forming the CMP dummy film.

3. The fabrication method for thin film magnetic heads according to claim 2, wherein the magnetic film is a soft magnetic material.

4. The fabrication method for thin film magnetic heads according to claim 3, wherein a film thickness lower limit position of the upper shield film, the magnetic film or the soft magnetic film is a position lower than a film thickness upper limit position of the CPP sensor film.

5. The fabrication method for thin film magnetic heads according to claim 3, wherein the CPP sensor film is a multilayer film including a free layer functioning as a magnetic signal field sensor film; and a film thickness lower limit position of the upper shield film, the magnetic film or the soft magnetic film is a position lower than a position of the free layer.

6. The fabrication method for thin film magnetic heads according to claim 2, wherein when a CMP etching rate of the first CMP stop film and the second CMP stop film is set as $\alpha$, and a CMP etching rate of the CMP dummy layer is set as $\beta$, and a CMP etching rate of the magnetic film is set as $\gamma$, then the etching rate relation is $\alpha<\beta<\gamma$.

7. The fabrication method for thin film magnetic heads according to claim 2, wherein the magnetic film is a hard magnetic material.

8. The fabrication method for thin film magnetic heads according to claim 1, wherein lift-off processing and planarizing processing, or planarizing processing are performed in the process for exposing the first CMP stop film.

9. The fabrication method for thin film magnetic heads according to claim 1, wherein the CPP sensor film is a multilayer film including a free layer functioning as a magnetic signal field sensor film.

10. The fabrication method for thin film magnetic heads according to claim 9, wherein the CPP sensor film includes a domain control layer for the free layer.

11. The fabrication method for thin film magnetic heads according to claim 1, wherein the CMP dummy film is a material comprised of one or a combination of silicon oxide, tantalum oxide, or tungsten oxide.

12. The fabrication method for thin film magnetic heads according to claim 1, further including forming a stripe height direction of the CPP sensor film after exposing the first CMP stop film, and before removing the CMP dummy film.

13. The fabrication method for thin film magnetic heads according to claim 1, wherein when a CMP etching rate of the first CMP stop film and the second CMP stop film is set as $\alpha$, and a CMP etching rate of the CMP dummy layer is set as $\beta$, the etching rate relation becomes $\alpha<\beta$.

14. A fabrication method for thin film magnetic heads comprising:
    forming a CPP sensor film over a lower shield;
    forming a first CMP stop film over the CPP sensor film;
    etching the CPP sensor film, and forming a width in the stripe height direction on the CPP sensor film;
    covering at least the etching section of the CPP sensor film with an insulating film;
    forming a CMP dummy film over the insulating film;
    forming a second CMP stop film over the CMP dummy film;
    exposing the first CMP stop film;
    removing the first CMP stop film and the second CMP stop film by oxygen RIE;
    removing the CMP dummy film by fluorine RIE; and
    forming an upper shield film over the insulating film and over the CPP sensor film.

15. The fabrication method for thin film magnetic heads according to claim 14, further including forming a magnetic film over the insulating film between covering at least the etching section of the CPP sensor film with insulating film and forming the CMP dummy film.

16. The fabrication method for thin film magnetic heads according to claim 15, wherein a film thickness lower limit position of the upper shield film in a stripe height direction or the magnetic film is a position lower than a film thickness upper limit position of the CPP sensor film.

17. The fabrication method for thin film magnetic heads according to claim 15, wherein the CPP sensor film is a multilayer film including a free layer functioning as a magnetic signal field sensor film; and a film thickness lower limit position of the upper shield film in a stripe height direction or, the magnetic film is a position lower than a position of the free layer.

18. The fabrication method for thin film magnetic heads according to claim 15, wherein when a CMP etching rate of the first CMP stop film and the second CMP stop film is set as $\alpha$, and a CMP etching rate of the CMP dummy layer is set as $\beta$, and a CMP etching rate of the magnetic film is set as $\gamma$, then the etching rate relation is $\alpha<\beta<\gamma$.

19. The fabrication method for thin film magnetic heads according to claim 14, wherein lift-off processing and planarizing processing, or planarizing processing are performed in the process for exposing the first CMP stop film.

20. The fabrication method for thin film magnetic heads according to claim 14, wherein the CPP sensor film is a multilayer film including a free layer functioning as a magnetic signal field sensor film.

21. The fabrication method for thin film magnetic heads according to claim 20, wherein the CPP sensor film includes a domain control layer for the free layer.

22. The fabrication method for thin film magnetic heads according to claim 14, wherein the CMP dummy film is a material comprised of one or a combination of silicon oxide, tantalum oxide, or tungsten oxide.

23. The fabrication method for thin film magnetic heads, according to claim 14, including a process for forming a stripe height width of the CPP sensor film after the process for exposing the first CMP stop film, and before the process for removing the CMP dummy film.

24. The fabrication method for thin film magnetic heads, according to claim 14, wherein when a CMP etching rate of the first CMP stop film and a second CMP stop film is set as $\alpha$, and a CMP etching rate of the CMP dummy layer is set as, the etching rate relation becomes $\alpha<\beta$.

* * * * *